(12) United States Patent
Wu et al.

(10) Patent No.: US 12,327,575 B2
(45) Date of Patent: Jun. 10, 2025

(54) METHOD AND APPARATUS OF GENERATING AUDIO AND VIDEO MATERIALS

(71) Applicant: SHANGHAI HODE INFORMATION TECHNOLOGY CO., LTD., Shanghai (CN)

(72) Inventors: Kejia Wu, Shanghai (CN); Yiou Li, Shanghai (CN); Qiming Chen, Shanghai (CN); Yiwen Ye, Shanghai (CN); Bonan Ma, Shanghai (CN); Ligen Wang, Shanghai (CN); Sizhen Zhu, Shanghai (CN); Jingwei Li, Shanghai (CN); Weifa Yuan, Shanghai (CN); Jingwei Ma, Shanghai (CN); Maosu He, Shanghai (CN)

(73) Assignee: SHANGHAI HODE INFORMATION TECHNOLOGY CO., LTD., Shanghai (CN)

(*) Notice: Subject to any disclaimer, the term of this patent is extended or adjusted under 35 U.S.C. 154(b) by 173 days.

(21) Appl. No.: 18/207,001

(22) Filed: Jun. 7, 2023

(65) Prior Publication Data

US 2023/0410848 A1 Dec. 21, 2023

(30) Foreign Application Priority Data

Jun. 9, 2022 (CN) .......................... 202210648636.1

(51) Int. Cl.
*G11B 27/034* (2006.01)
*G06F 40/279* (2020.01)
(Continued)

(52) U.S. Cl.
CPC .......... *G11B 27/034* (2013.01); *G06F 40/279* (2020.01); *G06F 40/56* (2020.01); *G11B 27/036* (2013.01)

(58) Field of Classification Search
CPC ... G11B 27/034; G11B 27/036; G06F 40/279; G06F 40/56; G06F 40/211; G06F 40/289;
(Continued)

(56) References Cited

U.S. PATENT DOCUMENTS

| | | | | |
|---|---|---|---|---|
| 11,581,020 B1 * | 2/2023 | Hadap | .................. | G11B 27/036 |
| 11,582,519 B1 * | 2/2023 | Bhat | .................. | H04N 21/4666 |

(Continued)

FOREIGN PATENT DOCUMENTS

| | | |
|---|---|---|
| CN | 101482975 A | 7/2009 |
| CN | 111508064 A | 8/2020 |

(Continued)

*Primary Examiner* — William C Vaughn, Jr.
*Assistant Examiner* — Stephen R Smith
(74) *Attorney, Agent, or Firm* — BakerHostetler (57) ABSTRACT

This application provides techniques for generating audio and video materials. The techniques comprise receiving an audio and video material generation request for generating a target audio and video material corresponding to a sequence of phonemes, the audio and video material generation request including a character identifier representing a character in the target audio and video material; determining a target set based on the character identifier, wherein the target set includes phoneme information and video segments corresponding to the phoneme information, wherein the phoneme information indicates timings of phonemes, and wherein the target set is among pre-created character sets corresponding to different characters; obtaining a phoneme information sequence from the target set based on the phoneme sequence; and determining a video segment corresponding to each piece of phoneme information in the phoneme information sequence, and generating a target audio and video material corresponding to the phoneme sequence.

20 Claims, 5 Drawing Sheets

(51) Int. Cl.
*G06F 40/56* (2020.01)
*G11B 27/036* (2006.01)

(58) Field of Classification Search
CPC ............... G10L 13/027; G10L 13/047; H04N 21/44016
USPC .................................. 386/278, 282; 348/465
See application file for complete search history.

(56) References Cited

U.S. PATENT DOCUMENTS

| | | | | |
|---|---|---|---|---|
| 11,830,476 | B1* | 11/2023 | Karanasou | G06N 3/0455 |
| 12,100,383 | B1* | 9/2024 | Ezzerg | G06N 3/045 |
| 2006/0129400 | A1 | 6/2006 | Fields et al. | |
| 2009/0027552 | A1* | 1/2009 | Yang | H04N 7/0122 |
| | | | | 348/465 |
| 2013/0124206 | A1 | 5/2013 | Rezvani et al. | |
| 2015/0089530 | A1* | 3/2015 | Abele | G11B 27/34 |
| | | | | 725/25 |
| 2022/0051463 | A1* | 2/2022 | Edwards | G10L 15/22 |
| 2022/0172709 | A1* | 6/2022 | Christie | H04N 21/8106 |
| 2022/0199086 | A1* | 6/2022 | Liu | G06F 40/279 |
| 2023/0178069 | A1* | 6/2023 | Vaughan | G10L 13/047 |
| | | | | 704/260 |

FOREIGN PATENT DOCUMENTS

| | | |
|---|---|---|
| CN | 112184858 A | 1/2021 |
| CN | 112734889 A | 4/2021 |
| CN | 113112575 A | 7/2021 |
| CN | 113539240 A | 10/2021 |
| CN | 114242070 A | 3/2022 |
| CN | 114333839 A | 4/2022 |
| WO | WO 2022/048405 A1 | 3/2022 |

* cited by examiner

FIG. 5 a method of generating audio and video materials according to an embodiment of this application.

METHOD AND APPARATUS OF GENERATING AUDIO AND VIDEO MATERIALS

CROSS-REFERENCE TO RELATED APPLICATION

The present application claims priority to Chinese Patent Application No. 202210648636.1, filed on Jun. 9, 2022, which is incorporated herein by reference in its entirety.

BACKGROUND

With continuous development of video processing technologies, a user has an increasing demand for video processing. Currently, to improve experience of viewing a video by the user, an original video may be re-created to generate an audio and video that meets a requirement. For example, duplicate content in the original video is deleted, and a highlight in the original video is edited.

SUMMARY

In view of this, embodiments of this application provide a method of generating audio and video materials. This application also relates to an apparatus of generating audio and video materials, a computing device, and a computer-readable storage medium, to resolve a technical problem, in the conventional technology, that there is relatively low audio and video material generation efficiency.

According to a first aspect of the embodiments of this application, a method of generating audio and video materials is provided, and includes:
  receiving an audio and video material generation request for generating a target audio and video material corresponding to a sequence of phonemes, where the audio and video material generation request includes a character identifier representing a character in the target audio and video material;
  determining a target set based on the character identifier, where the target set includes phoneme information and video segments corresponding to the phoneme information, where the phoneme information indicates timings of phonemes, and where the target set is among pre-created sets corresponding to different characters;
  obtaining a phoneme information sequence from the target set based on the phoneme sequence; and
  determining a video segment corresponding to each piece of phoneme information in the phoneme information sequence, and generating a target audio and video material corresponding to the phoneme sequence.

According to a second aspect of the embodiments of this application, an apparatus of generating audio and video materials is provided, and includes:
  a receiving module, configured to receive an audio and video material generation request for generating a target audio and video material corresponding to a sequence of phonemes, where the audio and video material generation request includes a character identifier representing a character in the target audio and video material;
  a determining module, configured to determine a target set based on the character identifier, where the target set includes phoneme information and video segments corresponding to the phoneme information, where the phoneme information indicates timings of phonemes, and where the target set is among pre-created sets corresponding to different characters;
  an obtaining module, configured to obtain a phoneme information sequence from the target set based on the phoneme sequence; and
  a generation module, configured to: determine a video segment corresponding to each piece of phoneme information in the phoneme information sequence, and generate a target audio and video material corresponding to the phoneme sequence.

According to a third aspect of the embodiments of this application, a computing device is provided, and includes a memory, a processor, and computer instructions stored in the memory and capable of running on the processor. When the processor executes the computer instructions, the steps of the method of generating audio and video materials are implemented.

According to a fourth aspect of the embodiments of this application, a computer-readable storage medium is provided. The computer-readable storage medium stores computer instructions. When the computer instructions are executed by a processor, the steps of the method of generating audio and video materials are implemented.

According to the method of generating audio and video materials provided in this application, the audio and video material generation request for the phoneme sequence is received, where the audio and video material generation request includes the character identifier; the target set is determined based on the character identifier, where the target set includes the phoneme information and the video material corresponding to the phoneme information; the phoneme information sequence is obtained from the target set based on the phoneme sequence; and the video material corresponding to each piece of phoneme information in the phoneme information sequence is determined, and the target audio and video material corresponding to the phoneme sequence is generated.

According to an embodiment of this application, the corresponding phoneme information sequence is obtained based on the phoneme sequence, and then the target audio and video material is generated based on the phoneme information sequence and the video material, to improve audio and video material generation efficiency.

DESCRIPTION OF EMBODIMENTS

Many specific details are described in the following descriptions to facilitate full understanding of this application. However, this application can be implemented in many other manners different from those described herein. A person skilled in the art may make similar promotion without departing from the connotation of this application. Therefore, this application is not limited to the specific implementations disclosed below.

Terms used in one or more embodiments of this application are merely used to describe specific embodiments, but are not intended to limit the one or more embodiments of this application. The terms "a", "the", and "this" of singular forms used in one or more embodiments and the appended claims of this application are also intended to include plural forms, unless otherwise specified in the context clearly. It should be further understood that the term "and/or" used in one or more embodiments of this application indicates and includes any or all possible combinations of one or more associated listed items.

It should be understood that although terms such as "first" and "second" may be used in one or more embodiments of this application to describe various types of information, the information is not limited to these terms. These terms are merely used to distinguish between information of a same type. For example, without departing from the scope of one or more embodiments of this application, "first" may also be referred to as "second", and similarly, "second" may also be referred to as "first". Depending on the context, for example, the word "if" used herein may be explained as "while", "when", or "in response to determining".

Terms related to one or more embodiments of this application are first explained.

Pulse code modulation (PCM) format: The pulse code modulation format is an audio format.

Overlap, fade-in, and fade-out: To make a spelling product sound like a single fast and continuous sound, when an initial and a final are spliced, some audio needs to overlap, and there needs to be a fade-out effect at an end of the initial and a fade-in effect at the beginning of the final, so that there is a more natural synthesis effect.

Spelling: In video creation, when a sound that is made by a specific character and that does not exist in an original sound material needs to be used, an initial and a final used to synthesize the required sound are found from the original sound material for splicing and adjustment, to obtain a corresponding material.

Currently, in video creation, all required sounds need to be determined based on a conceived solution, and are compared with original sound audio used for material capturing. If there is no corresponding original sound for the sound required for creation, the sound needs to be implemented by using a spelling capability. The sound that needs to be spelled is divided into an initial and a final, and original sound word audio that includes the required initial and the required final is found and cut from the original sound audio. In audio processing software or the like, an original sound initial word and final required for spelling are dragged into a track to respectively cut an initial part and a final part. More finals need to be retained in the initial part. Then, overlapping is performed to some extent at a position at which the initial and the final are connected to each other, and a fade-in curve and a fade-out curve are used for volume of an overlapping part. The audio is continuously adjusted to obtain required audio, and a corresponding picture and subtitle are added.

However, in the foregoing creation manner, a creator needs to collect statistics on all word material sounds in original sound audio in advance, and then compare a required sound with an original sound to determine a sound that needs to be spelled. This process is time-consuming and laborious. In addition, professional audio processing software needs to be used in a spelling process, and adjustment needs to be repeatedly performed to obtain spelling audio of relatively good quality. This is demanding and time-consuming. Consequently, only a few professional creators can spell and use a required sound with a good effect, and creativity is limited by the original sound audio, and there is limited freedom in creation.

In a method of generating audio and video materials, an existing audio material library is expanded, to improve audio and video material generation efficiency. Therefore, a user is no longer limited by original sound video for video creation, and creation experience of the user is improved.

This application provides a method of generating audio and video materials. This application also relates to an apparatus of generating audio and video materials, a computing device, and a computer-readable storage medium. The method of generating audio and video materials, the apparatus of generating audio and video materials, the computing device, and the computer-readable storage medium are described in detail in the following embodiments one by one.

Figure 1:
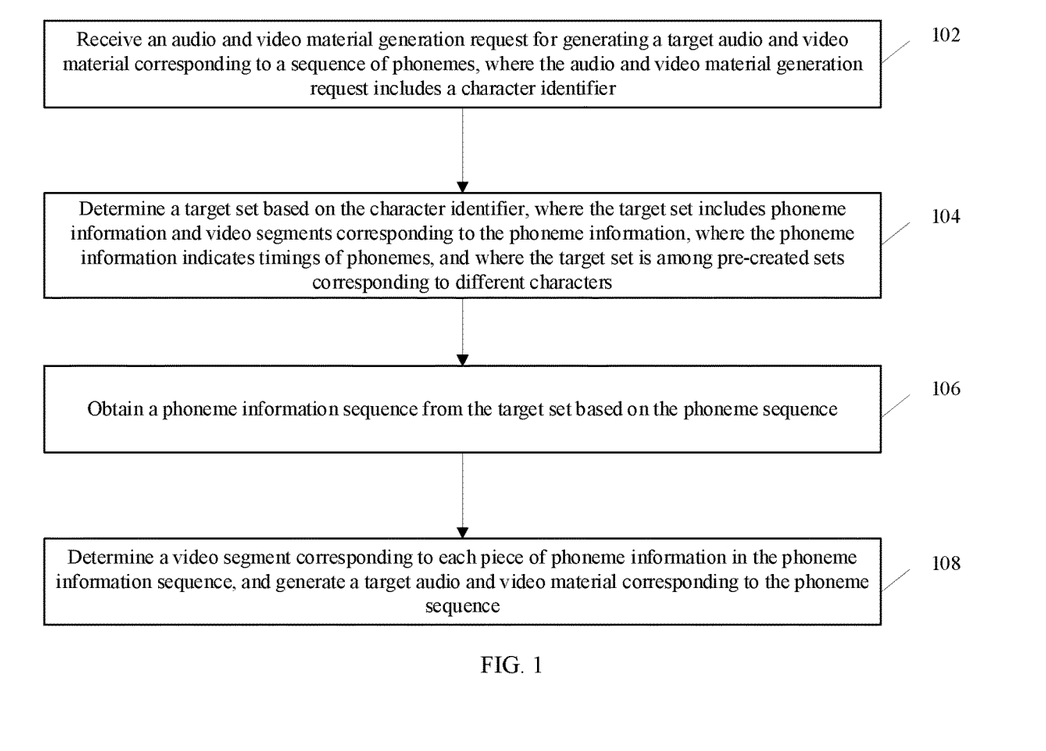
FIG. 1 is a flowchart of a method of generating audio and video materials according to an embodiment of this application.

FIG. 1 is a flowchart of a method of generating audio and video materials according to an embodiment of this application. The method specifically includes the following steps.

Step 102: Receive an audio and video material generation request for generating a target audio and video material corresponding to a sequence of phonemes, where the audio and video material generation request includes a character identifier.

The audio and video material generation request is a request for generating an audio and video corresponding to the phoneme sequence. The audio and video includes audio and video content corresponding to the phoneme sequence. A phoneme is a smallest speech unit obtained through division based on a language attribute. In some embodiments, the phoneme refers to an initial such as b, p, or m or a final such as ai, ei, ao, or ou in Chinese phonetic alphabet. The phoneme sequence is a sequence that includes phonemes, and at least one piece of corresponding text may be determined based on the phoneme sequence. For example, the phoneme sequence is "wo" that includes an initial "w" and a final "o", corresponding text may be determined based on the phoneme sequence "wo", for example, 我 " or 握 ". For another example, the phoneme sequence is "gu li", and corresponding text may be determined based on the phoneme sequence, for example, 鼓励 " or 谷粒 ".

Specifically, the audio and video material generation request includes the character identifier. The character identifier refers to a field that can uniquely represent a target character. For example, a character A and a character B are included in a video. In this case, a character identifier "1" may represent the character A, and a character identifier "2" may represent the character B. The character identifier in the audio and video material generation request can facilitate subsequent determining of data corresponding to the character identifier, to generate an audio and video material.

For example, an audio and video material generation request Q for a phoneme sequence "gong ji" is received, where the audio and video material generation request Q includes a character identifier "x".

The audio and video material generation request that includes the character identifier for the phoneme sequence is received, so that data corresponding to the target character identifier is subsequently determined, to generate an audio and video material corresponding to the phoneme sequence.

In actual application, the phoneme sequence may be obtained based on target text, that is, the target text is recognized to obtain the phoneme sequence; or an audio and video material generation request for target text may be received, and the target text may be recognized to obtain the phoneme sequence.

Specifically, before the audio and video material generation request for the phoneme sequence is received, the method may further include:

obtaining the target text; and recognizing the target text to obtain the phoneme sequence corresponding to the target text.

The target text is text that can be recognized to obtain the phoneme sequence. In actual application, the target text may be determined based on a service requirement. For example, if text 今天 " is common text, 今天 " may be used as the target text; and after the target text is determined, the target text is recognized to obtain the phoneme sequence corresponding to the target text, for example, target text 向右转 " is recognized to obtain a corresponding phoneme sequence "xiang you zhuan".

In addition, the phoneme sequence may be recognized in target audio, a technician may splice phonemes to obtain the phoneme sequence, or the like. A source of the phoneme sequence is not specifically limited in this application.

Further, when the target text includes a plurality of words, each word included in the target text may be obtained through division, and a phoneme corresponding to each word may be determined, to form the phoneme sequence corresponding to the target text.

Specifically, a method for recognizing the phoneme sequence of the target text may include:

splitting the target text to obtain a target word in the target text; and recognizing phonemes corresponding to each target word, and forming the phoneme sequence corresponding to the target text based on the recognized phonemes.

The target word is a word included in the target text. For example, if the target text is 向右转 ", target words obtained by recognizing the target text are respectively 向 ", 右 ", and 转 ". The phoneme subsequence is a phoneme sequence corresponding to the target word. For example, it is determined that the target words are respectively 向 " and 右 ", it is recognized that a phoneme subsequence corresponding to the target word 向 " is "xiang", and it is recognized that a phoneme subsequence corresponding to the target word 右 " is "you". After the phoneme subsequence corresponding to each target word is determined, all the phoneme subsequences are spliced to obtain the phoneme sequence corresponding to the target text.

In actual application, a manner of recognizing the phoneme sequence may be: inputting the target text to a pre-trained phoneme sequence recognition model, and obtaining the phoneme sequence output by the phoneme sequence recognition model based on the target text; or recognizing each target word in the target text, determining the phoneme subsequence corresponding to each target word, and splicing all the phoneme subsequences to obtain the phoneme sequence.

For example, it is determined that the target text is 昨天 "; target words 昨 " and 天 " included in the target text are recognized; the target word 昨 " is recognized to obtain a corresponding phoneme subsequence "zuo", and the target word 天 " is recognized to obtain a corresponding phoneme subsequence "tian"; and the phoneme subsequences corresponding to the target words are spliced in an order of the target words in the target text, to obtain a phoneme sequence "zuo tian" corresponding to the target text.

The corresponding phoneme sequence is obtained based on the target text, or the preset phoneme sequence is directly obtained. In this way, a channel for obtaining the phoneme sequence is enriched, and richness of the phoneme sequence is enhanced.

Step 104: Determine a target set based on the character identifier, where the target set includes phoneme information and video segments corresponding to the phoneme information, where the phoneme information indicates timings of phonemes, and where the target set is among pre-created sets corresponding to different characters.

The target set is a set that corresponds to the character identifier and that includes the phoneme information and the video material corresponding to the phoneme information. In actual application, different character identifiers correspond to different phoneme information sets, for example, the character identifier "1" corresponds to a phoneme information set a1. The target phoneme set includes phoneme information corresponding to the target character, that is, the target set corresponding to the target character may be determined based on the character identifier. The phoneme information refers to a time interval corresponding to the phoneme in the audio and video. For example, if a phoneme G is a final ang, and it is determined that a time interval corresponding to the final ang in the audio and video is from the third second to the fourth second, it is determined that phoneme information of the phoneme G is from the third second to the fourth second. The video material corresponding to the phoneme information refers to a video segment captured from the audio and video based on the phoneme information.

Specifically, after the character identifier in the audio and video material generation request is determined, the target set corresponding to the character identifier is determined in at least one created phoneme information set based on the character identifier. The target set includes the phoneme information of the target character corresponding to the character identifier and the video segment corresponding to the phoneme information.

For example, a phoneme information set a3 corresponding to a character identifier "3" is determined in the phoneme information set a1, a phoneme information set a2, and the phoneme information set a3 based on the character identifier "3". The phoneme information set a3 includes phoneme information of a target character "Zhang San" corresponding to the character identifier "3" and a video segment corresponding to the phoneme information.

The target set corresponding to the character identifier is determined, so that the audio and video material is subsequently generated based on the phoneme information and the video segment corresponding to the phoneme information in the target set.

Before the corresponding target set is determined based on the character, phoneme information sets corresponding to different characters need to be created, so that a corresponding phoneme information set can be subsequently found based on a character identifier.

Specifically, before the target set is determined based on the character identifier, the method may further include:

determining a to-be-processed audio and video, and generating character phoneme information of a target character in the to-be-processed audio and video;

capturing video segments from the to-be-processed audio and video based on the character phoneme information; and generating a character phoneme information set corresponding to the target character based on the character phoneme information and the captured video segments.

The to-be-processed audio and video refers to an audio and video file that includes audio content and video content corresponding to the audio content. The target character is a character included in the to-be-processed audio and video. The to-be-processed audio and video may include a plurality of characters, a corresponding audio segment existing when a phoneme corresponding to each character is played is recognized in the to-be-processed audio and video, and character phoneme information corresponding to the character is generated based on a start time point and an end time point corresponding to the audio segment. For example, audio corresponding to the character A and audio corresponding to the character B are included in a television drama video L, after an audio segment corresponding to the character A is recognized, a start time point "three minutes and 25 seconds" and an end time point "three minutes and 54 seconds" of the audio segment are determined, and character phoneme information corresponding to the character A is generated based on the start time point and the end time point.

For another example, an audio segment corresponding to a character S and existing when an initial "zh" of a word "Zhang" is read is recognized in the audio and video, to obtain phoneme information corresponding to the initial "zh".

After the character phoneme information is recognized, the character phoneme information may be reviewed to ensure accuracy of the character phoneme information. After the character phoneme information is determined, the video material corresponding to the character phoneme information is captured from the to-be-processed audio and video based on the character phoneme information. For example, a video segment whose time is from the fourth second to the eighth second is captured from the to-be-processed audio and video H based on character phoneme information "from the fourth second to the eighth second", and is used as a video material corresponding to the character phoneme information. The character phoneme information set corresponding to the target character is generated based on the determined character phoneme information and the video material corresponding to the character phoneme information.

Further, a method for recognizing the character phoneme information of the target character in the to-be-processed audio and video may include:

determining a preset phoneme recognition rule;

recognizing an initial phoneme and a final phoneme of the target character in audio in the to-be-processed audio and video based on the preset phoneme recognition rule to form a phoneme set; and determining time interval information corresponding to each phoneme in the phoneme set in the audio, and generating the character phoneme information based on the time interval information.

The preset phoneme recognition rule is a rule for recognizing a phoneme corresponding to the target character in the to-be-processed audio and video. The audio in the to-be-processed audio and video is the audio content in the to-be-processed audio and video. The initial phoneme is a consonant before the final phoneme, and may be a phoneme that can form a complete phoneme sequence with the final. The final phoneme is a phoneme that can form a complete phoneme sequence with the initial phoneme.

For example, the initial phoneme and the final phoneme corresponding to the target character are recognized in the to-be-processed audio and video by using the preset phoneme recognition rule R.

In this application, an objective of recognizing the initial phoneme and the final phoneme in the audio corresponding to the audio and video is to combine and splice different initial phonemes and different final phonemes to obtain a phoneme sequence that is not included in the to-be-processed audio and video, so that the audio and video material corresponding to the phoneme sequence can be subsequently obtained.

The phoneme set is generated based on the collected initial phoneme and final phoneme corresponding to the to-be-processed audio and video. The time interval information corresponding to each phoneme in the phoneme set in the audio in the to-be-processed audio and video is determined. For example, it is determined that time interval information of a phoneme K in the audio is "from the third second to the fifth second". Specifically, time interval information corresponding to each initial phoneme and time interval information corresponding to each final phoneme in the phoneme set are determined. The time interval information corresponding to each phoneme is used as the phoneme information corresponding to each phoneme.

Step 106: Obtain a phoneme information sequence from the target set based on the phoneme sequence.

The phoneme information sequence is a sequence generated based on phoneme information corresponding to the phoneme sequence. Phoneme information corresponding to the phoneme in the phoneme sequence is obtained from the target phoneme set based on the phoneme sequence, and the phoneme information sequence corresponding to the phoneme sequence is formed based on the determined phoneme information corresponding to each phoneme in the phoneme sequence.

For example, a phoneme sequence "hao" and a character phoneme information set corresponding to the character identifier "3" are determined; phoneme information m1 "from 1.5 seconds to 1.6 seconds" corresponding to a phoneme "h" and phoneme information m2 "from 1.6 seconds to 1.8 seconds" corresponding to a phoneme "ao" are determined in the character phoneme information set based on the sequence; and a phoneme information sequence corresponding to the phoneme sequence "hao" is generated based on the phoneme information m1 and the phoneme information m2.

The phoneme information sequence is determined in the target set based on the phoneme sequence, so that the audio and video material corresponding to the phoneme sequence is subsequently generated based on the phoneme information sequence.

Step 108: Determine a video segment corresponding to each piece of phoneme information in the phoneme information sequence, and generate a target audio and video material corresponding to the phoneme sequence.

After the phoneme information sequence is determined in the target set, the video material corresponding to the phoneme in the phoneme information sequence is determined in the target set based on the phoneme information sequence; and the target audio and video material is generated based on the phoneme information and the video material corresponding to the phoneme information.

Specifically, a method for determining the video material corresponding to each piece of phoneme information in the phoneme information sequence, and generating the target audio and video material corresponding to the phoneme information sequence may include:
- capturing audio segments in an initial format from audio corresponding to the phoneme information sequence based on a preset capturing rule;
- splicing the audio segments into a target audio material based on a preset splicing rule; and
- generating a target video material based on the video segment corresponding to each piece of phoneme information, and aligning the target audio material and the target video material to generate the target audio and video material.

The preset capturing rule is a rule for capturing an audio segment from the audio. The initial format is a format corresponding to the audio segment. For example, an audio segment in a PCM format is captured from the audio based on the capturing rule. The audio segment in the initial format that facilitates audio processing is captured, to facilitate subsequent splicing of the audio segment. The preset splicing rule is a rule for splicing the audio segment. For example, the preset splicing rule is a rule for splicing an initial audio segment and a final audio segment in an overlapping manner. In actual application, a poor audio effect is achieved after the audio segment is simply spliced. Therefore, the audio segment may be spliced by using the preset splicing rule in an audio splicing manner such as overlapping or fading in and fading out, to obtain the target audio material. The target audio material is an audio material used to generate the target audio and video material. The target video material is a video material used to generate the target audio and video material.

For example, an audio segment in the PCM format corresponding to each phoneme in a phoneme sequence G is captured from audio corresponding to the phoneme sequence G based on the preset capturing rule; each audio segment is spliced based on the preset splicing rule, to obtain a target audio material; a video material corresponding to each phoneme in the phoneme sequence G is spliced into a target video material; and the target video material and the target audio material are aligned to obtain a target audio and video material.

In actual application, a method for aligning the target audio material and the target video material to generate the target audio and video material may include:
- determining an audio duration corresponding to the target audio material and a video duration corresponding to the target video material; and
- adjusting the audio duration and the video duration such that they are consistent with each other, and generating the target audio and video material based on the adjusted target video material and the adjusted target audio material.

The audio duration information refers to a time length required for playing the target audio material. The video duration information refers to a time length required for playing the target video material.

Specifically, in a process of generating the target audio material, the audio duration information corresponding to the target audio material is increased. Therefore, to keep audio duration and video duration of the generated target audio and video material consistent with each other, the audio duration and/or the video duration need/needs to be adjusted. That is, the video duration information is adjusted to be consistent with the audio duration information, and then the target audio material and the target video material are spliced to obtain the target audio and video material.

It should be noted that in actual application, the target audio and video material may be generated based on the target audio material and a part of the target video material, for example, the target audio and video material may be generated based only on a video material corresponding to the final phoneme. In this case, the audio duration is inconsistent with the video duration. Therefore, processing such as speed change needs to be performed on the audio material or the video material, to ensure that the audio duration information is consistent with the video duration information.

After the target audio and video material corresponding to the phoneme sequence is generated, the method may further include:
- storing the target audio and video material, the phoneme sequence, and a corresponding relationship between them in an audio and video material library.

The target audio and video material and the phoneme sequence are correspondingly stored in the audio and video material library, so that a user subsequently searches for or browses the audio and video material in the audio and video material library.

Further, after the target audio and video material and the phoneme sequence are correspondingly stored in the audio and video material library, the method may further include:
- receiving a video generation request for generating a video of a target character, where the request includes a to-be-processed phoneme sequence;
- obtaining a to-be-processed audio and video material from the audio and video material library based on the to-be-processed phoneme sequence; and
- generating a target video based on the to-be-processed audio and video material.

The video generation request is a request for generating a video based on the audio and video material. The video generation request may be to generate a video generation request for the target character. For example, a video generation request for the target character "Zhang San" is received, that is, a video generation request with the target character "Zhang San" as an audio material is generated.

The to-be-processed phoneme sequence is carried in the video generation request, to obtain the audio and video material corresponding to the to-be-processed phoneme sequence from the audio and video material library. The to-be-processed audio and video material is an audio and video material corresponding to the to-be-processed phoneme sequence. The target video is generated based on the to-be-processed audio and video material.

In actual application, the video generation request may include video processing information; and a specific method for generating a target audio and video based on the target audio and video material may include:
- processing the target audio and video material based on the video processing information, to obtain the target audio and video.

The video processing information is information used to process the target audio and video material. For example, the video processing information is to adjust the target audio and video material to 2×, or to add a black and white filter effect to the target audio and video material.

For example, it is determined that the video processing information is to adjust the target audio and video material to 0.5×. After an audio and video material H is determined, the audio and video material H is adjusted to 0.5× based on the video processing information.

In actual application, the user may query a corresponding audio and video material in the audio and video material library by entering text or a phoneme sequence. When content entered by the user in a search box is text, after a corresponding audio and video material is found, a default subtitle of the audio and video material is consistent with the text entered by the user. In this case, the video processing information may include information for adjusting the default subtitle.

Specifically, when the target audio and video material includes a default subtitle, a method for processing the target audio and video material based on the video processing information, to obtain the target video may include:

determining a to-be-processed default subtitle in the target audio and video material; and adjusting the to-be-processed default subtitle based on the video processing information to generate the target video that includes a target subtitle.

The to-be-processed default subtitle is a subtitle that needs to be adjusted in the target audio and video material. Subtitle adjustment information included in the video processing information is determined, and the to-be-processed default subtitle is adjusted based on the subtitle adjustment information, to obtain the target subtitle, that is, to obtain the target video that includes the target subtitle.

For example, it is determined that the to-be-processed default subtitle in the target audio and video material is "it is sunny today"; and it is determined that the subtitle adjustment information is "to delete "today" and "sunny" and to add "cloudy"", and the to-be-processed default subtitle is adjusted based on the subtitle adjustment information, to obtain the target video that includes the target subtitle "it is cloudy".

According to the method of generating audio and video materials in this application, the audio and video material generation request for the phoneme sequence is received, where the audio and video material generation request includes the character identifier; the target set is determined based on the character identifier, where the target set includes the phoneme information and the video material corresponding to the phoneme information; the phoneme information sequence is obtained from the target set based on the phoneme sequence; and the video material corresponding to each piece of phoneme information in the phoneme information sequence is determined, and the target audio and video material corresponding to the phoneme sequence is generated. The corresponding phoneme information sequence is obtained based on the phoneme sequence, and then the target audio and video material is generated based on the phoneme information sequence and the video material, to improve audio and video material generation efficiency.

Figure 2:
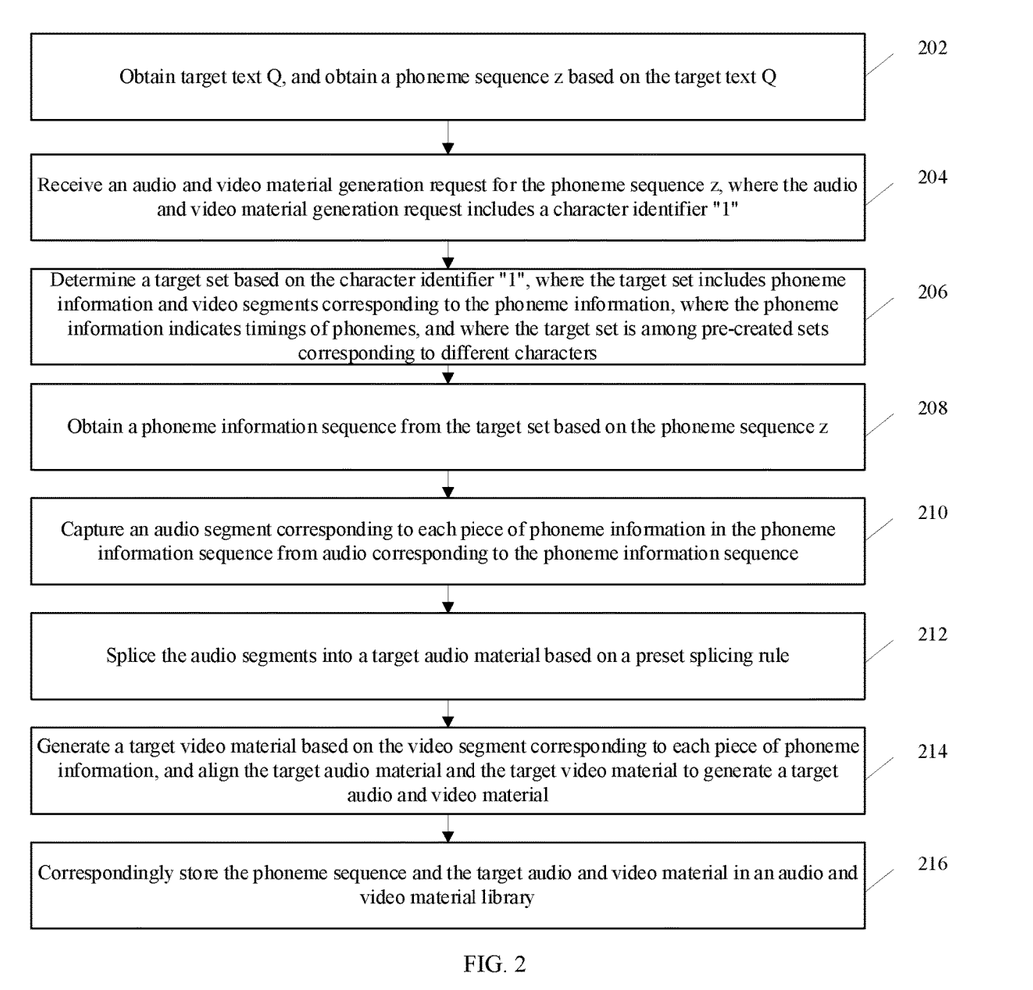
FIG. 2 is a processing flowchart of a method of generating audio and video materials applied to a phoneme sequence z according to an embodiment of this application.

With reference to FIG. 2, the method of generating audio and video materials provided in this application is further described below by using an example in which the method of generating audio and video materials is applied to a phoneme sequence z. FIG. 2 is a processing flowchart of a method of generating audio and video materials applied to a phoneme sequence z according to an embodiment of this application. The method specifically includes the following steps.

Step 202: Obtain target text Q, and obtain the phoneme sequence z based on the target text Q.

Specifically, the target text Q is text 再见 ", and a target character "Zhang San" does not have 再见 " audio in any video. The target text Q is recognized, to obtain the phoneme sequence "zai jian".

Step 204: Receive an audio and video material generation request for the phoneme sequence z, where the audio and video material generation request includes a character identifier "1".

Specifically, the character "Zhang San" may be determined based on the character identifier "1"; and the audio and video material generation request for the phoneme sequence z is received, to subsequently generate an audio and video material corresponding to the character "Zhang San".

Step 206: Determine a target set based on the character identifier "1", where the target set includes phoneme information and video segments corresponding to the phoneme information, where the phoneme information indicates timings of phonemes, and where the target set is among pre-created sets corresponding to different characters.

Specifically, before the target set is determined based on the character identifier "1", the target set needs to be generated. A specific generation process may include: determining a to-be-processed audio and video, where the to-be-processed audio and video includes video content corresponding to the character "Zhang San"; recognizing an initial phoneme and a final phoneme of the target character "Zhang San" in audio in the to-be-processed audio and video based on a preset phoneme recognition rule to form a phoneme set; determining time interval information corresponding to each phoneme in the phoneme set in the audio in the video, and generating the character phoneme information based on the time interval information; capturing video segments from the to-be-processed audio and video based on the character phoneme information; and generating the target set corresponding to the target character "Zhang San" based on the obtained character phoneme information and the video material.

Step 208: Obtain a phoneme information sequence from the target set based on the phoneme sequence z.

Specifically, phonemes included in the phoneme sequence z are respectively compared with phonemes in the target set, to determine phoneme information corresponding to each phoneme in each phoneme sequence z, and the determined phoneme information forms the phoneme information sequence.

Step 210: Capture an audio segment corresponding to each piece of phoneme information in the phoneme information sequence from audio corresponding to the phoneme information sequence.

Specifically, the audio segment corresponding to each phoneme is captured from the audio based on the phoneme information, namely, a time interval in the audio. To facilitate subsequent splicing processing of the audio segment, an audio segment in a PCM format may be captured.

Step 212: Splice the audio segments into a target audio material based on a preset splicing rule.

Specifically, each audio segment is spliced in an overlapping manner, to obtain the target audio material.

Step 214: Generate a target video material based on the video segment corresponding to each piece of phoneme information, and align the target audio material and the target video material to generate a target audio and video material.

Specifically, the target video material is generated through splicing based on the video material corresponding to each piece of phoneme information in the target set; and duration of the target video material and the target audio material are adjusted to be consistent, and the target audio and video material is generated based on an adjusted target video material and an adjusted target audio material.

Step 216: Correspondingly store the phoneme sequence and the target audio and video material in an audio and video material library.

According to the method of generating audio and video materials in this application, the audio and video material generation request for the phoneme sequence is received, where the audio and video material generation request includes the character identifier; the target set is determined based on the character identifier, where the target set includes the phoneme information and the video material corresponding to the phoneme information; the phoneme information sequence is obtained from the target set based on the phoneme sequence; and the video material corresponding to each piece of phoneme information in the phoneme information sequence is determined, and the target audio and video material corresponding to the phoneme sequence is generated. The corresponding phoneme information sequence is obtained based on the phoneme sequence, and then the target audio and video material is generated based on the phoneme information sequence and the video material, to improve audio and video material generation efficiency.

Figure 3:
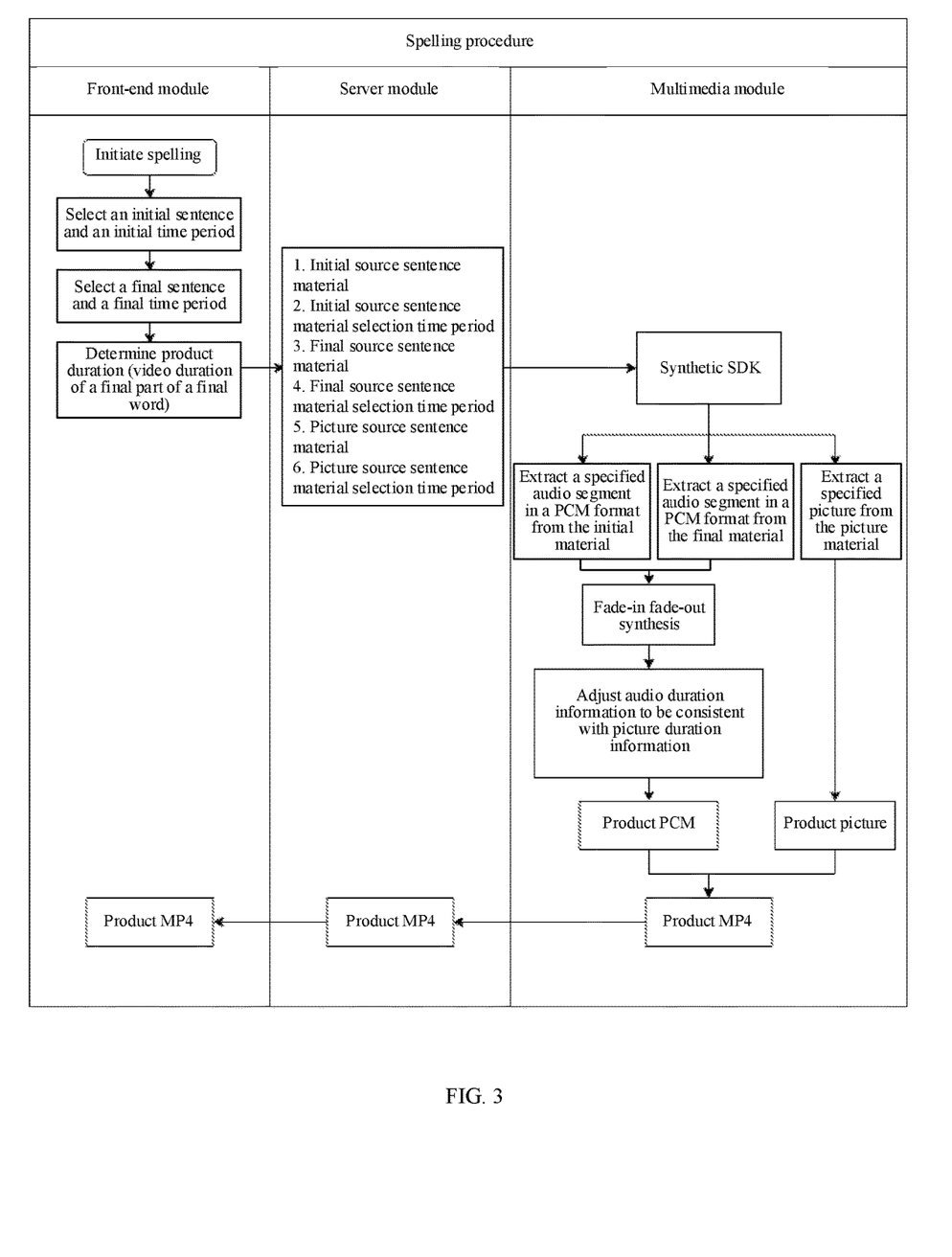
FIG. 3 is a schematic diagram of a method of generating audio and video materials according to an embodiment of this application.

The method of generating audio and video materials in this application is further described below with reference to FIG. 3. FIG. 3 is a schematic diagram of a method of generating audio and video materials according to an embodiment of this application.

FIG. 3 shows that a server may include a front-end module, a server module, and a multimedia module.

The front-end module initiates a spelling task after receiving a spelling request for a target character; selects initial sentences in an original sound video of the target character based on the spelling request, and determines an initial time period corresponding to each of the initial sentences; selects a final sentence in the original sound video of the target character, and determines a final time period corresponding to each final sentence; determines product duration, that is, determines video duration of a final part of a final word, for example, determines video duration, in the original sound video, corresponding to a final "ang" of a word "Wang" in the original sound video; and sends determined time information to the server module for further processing.

The server module performs data integration on determined time period data and a material source. Specifically, the server module determines an initial source sentence material, an initial source sentence material selection time period, a final source sentence material, a final source sentence material selection time period, a picture source sentence material, and a picture source sentence material selection time period; and subsequently collects a video and audio based on the material source and the corresponding selected time period, to generate an audio and video material.

The multimedia module includes a synthetic SDK for synthesizing an audio and video material. The synthetic SDK extracts an audio segment in a PCM format from the initial material based on the selected time period and the data collected by the server module, and extracts an audio segment in the PCM format from the final material based on the selected time period and the data collected by the server module; performs fade-in fade-out synthesis on an initial audio segment and a corresponding final audio segment, and adjusts audio duration information of synthesized audio, for example, changes a speed to make the audio duration information consistent with picture duration information corresponding to a picture, to obtain a product PCM; uses adjusted audio as an audio material; extracts a picture segment from the picture material based on the selected time period, and uses the picture segment as a picture material, namely, a product picture; splices the audio material and the picture material to obtain an audio and video material in an MP4 format, namely, a product MP4; may further adjust the audio and video material obtained through splicing, and store the audio and video material in a material library after a preset material requirement is met; and may return the generated audio and video material to the server module and the front-end module.

Figure 4:
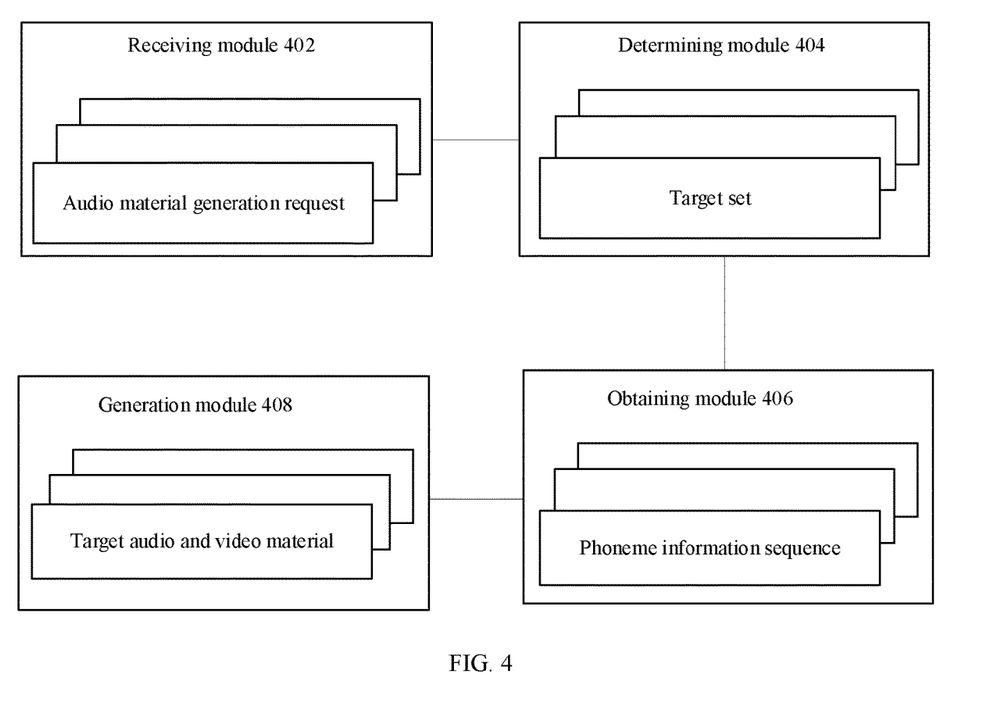
FIG. 4 is a schematic diagram of a structure of an apparatus of generating audio and video materials according to an embodiment of this application.

Corresponding to the method embodiments, this application further provides an embodiment of an apparatus of generating audio and video materials. FIG. 4 is a schematic diagram of a structure of an apparatus of generating audio and video materials according to an embodiment of this application. As shown in FIG. 4, the apparatus includes:

a receiving module 402, configured to receive an audio and video material generation request for generating a target audio and video material corresponding to a sequence of phonemes, where the audio and video material generation request includes a character identifier representing a character in the target audio and video material;

a determining module 404, configured to determine a target set based on the character identifier, where the target set includes phoneme information and video segments corresponding to the phoneme information, where the phoneme information indicates timings of phonemes, and where the target set is among pre-created sets corresponding to different characters;

an obtaining module 406, configured to obtain a phoneme information sequence from the target set based on the phoneme sequence; and a generation module 408, configured to: determine a video segment corresponding to each piece of phoneme information in the phoneme information sequence, and generate a target audio and video material corresponding to the phoneme sequence.

Optionally, the apparatus further includes a generation sub-module, configured to:
determine a to-be-processed audio and video, and generating character phoneme information of a target character in the to-be-processed audio and video;
capture video segments from the to-be-processed audio and video based on the character phoneme information; and
generate a character phoneme information set corresponding to the target character based on the character phoneme information and the captured video segments.

Optionally, the generation sub-module is further configured to:
determine a preset phoneme recognition rule;
recognize an initial phoneme and a final phoneme of the target character in audio in the to-be-processed audio and video based on the preset phoneme recognition rule to form a phoneme set; and
determine time interval information corresponding to each phoneme in the phoneme set in the audio, and generate the character phoneme information based on the time interval information.

Optionally, the apparatus further includes an obtaining sub-module, configured to:

obtain target text; and recognize the target text to obtain a phoneme sequence corresponding to the target text.

Optionally, the obtaining sub-module is further configured to:

split the target text to obtain a target word in the target text; and recognize a phoneme subsequence corresponding to each target word, and form the phoneme sequence corresponding to the target text by using all phoneme subsequences.

Optionally, the apparatus further includes a storage module, configured to:

correspondingly store the target audio and video material, the phoneme sequence, and a corresponding relationship between them in an audio and video material library.

Optionally, the apparatus further includes a target video generation module, configured to:

receive a video generation request for generating a video of a target character, where the request includes a to-be-processed phoneme sequence;

obtain a to-be-processed audio and video material from the audio and video material library based on the to-be-processed phoneme sequence; and generate a target video based on the to-be-processed audio and video material.

Optionally, the video generation request includes video processing information; and the target video generation module is configured to:

process the to-be-processed audio and video material based on the video processing information to generate the target video.

Optionally, the to-be-processed audio and video material includes a default subtitle; and the target video generation module is configured to:

determine a to-be-processed default subtitle in the to-be-processed audio and video material; and adjust the to-be-processed default subtitle based on the video processing information to generate the target video that includes a target subtitle.

Optionally, the generation module 408 is further configured to:

capture audio segments in an initial format from audio corresponding to the phoneme information sequence based on a preset capturing rule;

splice the audio segments into a target audio material based on a preset splicing rule; and generate a target video material based on the video segment corresponding to each piece of phoneme information, and align the target audio material and the target video material to generate the target audio and video material.

Optionally, the generation module 408 is further configured to:

determine an audio duration corresponding to the target audio material and a video duration corresponding to the target video material; and adjust the audio duration and the video duration such that they are consistent with each other, and generate the target audio and video material based on the adjusted target video material and the adjusted target audio material.

According to the apparatus of generating audio and video materials in this application, the receiving module is configured to receive the audio and video material generation request for the phoneme sequence, where the audio and video material generation request includes the character identifier; the determining module is configured to determine the target set based on the character identifier, where the target set includes the phoneme information and the video material corresponding to the phoneme information; the obtaining module is configured to obtain the phoneme information sequence from the target set based on the phoneme sequence; and the generation module is configured to: determine the video material corresponding to each piece of phoneme information in the phoneme information sequence, and generate the target audio and video material corresponding to the phoneme sequence. The corresponding phoneme information sequence is obtained, and then the target audio and video material is generated based on the phoneme information sequence and the video material, to improve audio and video material generation efficiency.

A schematic solution of the apparatus of generating audio and video materials in the embodiments is described above. It should be noted that the technical solution of the apparatus of generating audio and video materials and the technical solution of the method of generating audio and video materials belong to the same concept. For detailed content not described in detail in the technical solution of the apparatus of generating audio and video materials, refer to the descriptions of the technical solution of the method of generating audio and video materials.

Figure 5:
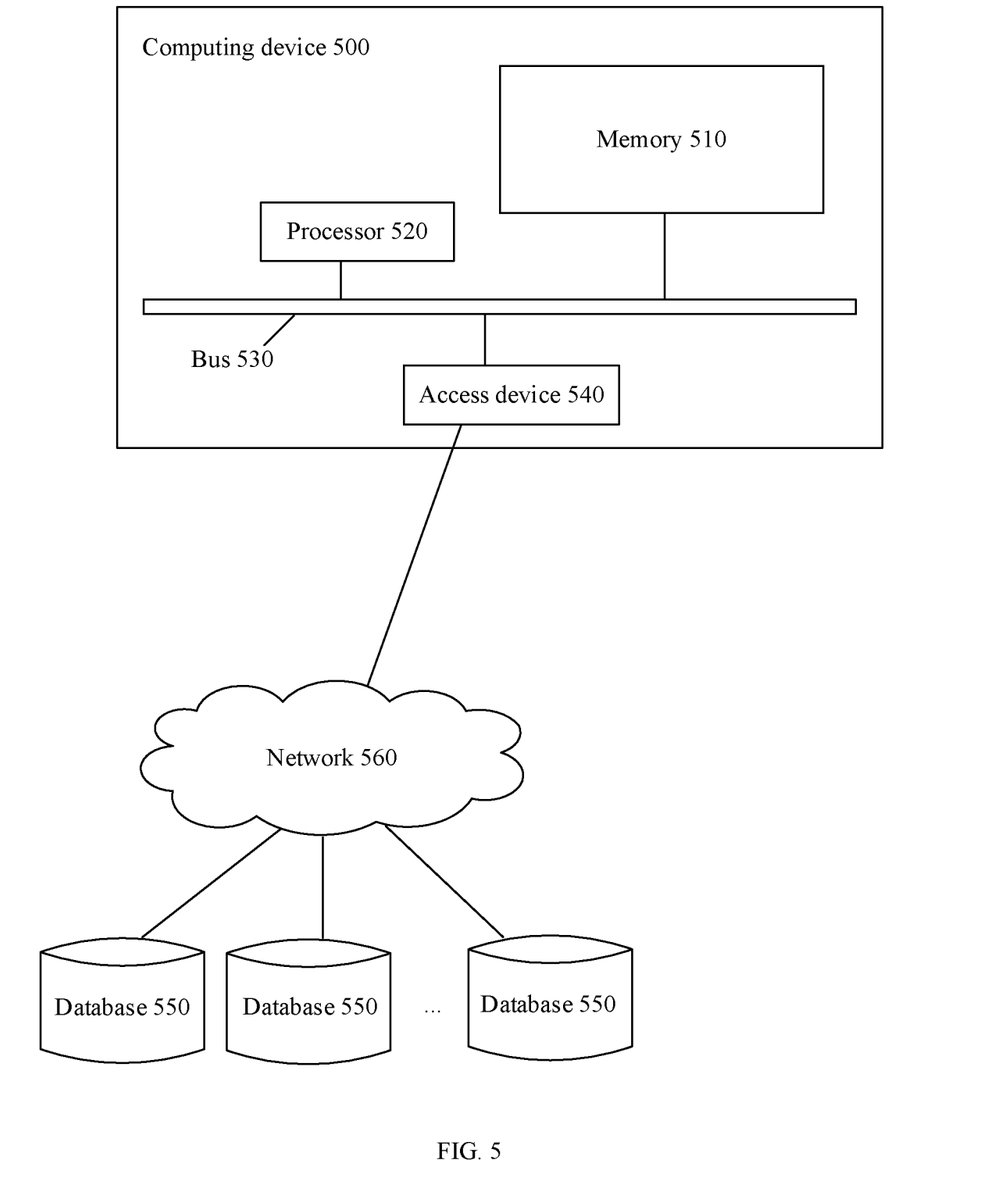
FIG. 5 is a block diagram of a structure of a computing device according to an embodiment of this application.

FIG. 5 is a block diagram of a structure of a computing device 500 according to an embodiment of this application. Components of the computing device 500 include but are not limited to a memory 510 and a processor 520. The processor 520 and the memory 510 are connected by using a bus 530, and a database 550 is configured to store data.

The computing device 500 further includes an access device 540, and the access device 540 enables the computing device 500 to perform communication by using one or more networks 560. Examples of these networks include a public switched telephone network (PSTN), a local area network (LAN), a wide area network (WAN), a private area network (PAN), or a combination of communication networks such as the Internet. The access device 540 may include one or more of any type of wired or wireless network interface (for example, a network interface card (NIC)), for example, an IEEE 802.11 wireless local area network (WLAN) wireless interface, a worldwide interoperability for microwave access (WiMAX) interface, an Ethernet interface, a universal serial bus (USB) interface, a cellular network interface, a Bluetooth interface, and a near field communication (NFC) interface.

In an embodiment of this application, the foregoing components of the computing device 500 and other components not shown in FIG. 5 may alternatively be connected to each other, for example, by using the bus. It should be understood that the block diagram of the structure of the computing device shown in FIG. 5 is merely used as an example instead of a limitation on the scope of this application. A person skilled in the art may add or replace other components as required.

The computing device 500 may be any type of static or mobile computing device, including a mobile computer or a mobile computing device (for example, a tablet computer, a personal digital assistant, a laptop computer, a notebook computer, or a netbook), a mobile phone (for example, a smartphone), a wearable computing device (for example, a smart watch or smart glasses), another type of mobile device, or a static computing device such as a desktop computer or a PC. The computing device 500 may alternatively be a mobile or static server.

When the processor 520 executes computer instructions, the steps of the method of generating audio and video materials are implemented.

A schematic solution of the computing device in the embodiments is described above. It should be noted that the technical solution of the computing device and the technical solution of the method of generating audio and video materials belong to a same concept. For detailed content not described in detail in the technical solution of the computing device, refer to the descriptions of the technical solution of the method of generating audio and video materials.

An embodiment of this application further provides a computer-readable storage medium. The computer-readable storage medium stores computer instructions. When the computer instructions are executed by a processor, the steps of the method of generating audio and video materials are implemented.

A schematic solution of the computer-readable storage medium in the embodiments is described above. It should be noted that the technical solution of the storage medium and the technical solution of the method of generating audio and video materials belong to a same concept. For detailed content not described in detail in the technical solution of the storage medium, refer to the descriptions of the technical solution of the method of generating audio and video materials.

Specific embodiments of this application are described above. Other embodiments fall within the scope of the appended claims. In some cases, actions or steps described in the claims may be performed in an order different from those in the embodiments and desired results may still be achieved. In addition, processes described in the accompanying drawings do not necessarily require a specific order or a sequential order shown to achieve the desired results. In some implementations, multi-task processing and parallel processing can or may be advantageous.

The computer instructions include computer program code. The computer program code may be in a source code form, an object code form, an executable file form, an intermediate form, or the like. The computer-readable medium may include any entity or apparatus that can carry the computer program code, a recording medium, a USB flash drive, a removable hard disk, a magnetic disk, an optical disc, a computer memory, a read-only memory (ROM), a random access memory (RAM), an electrical carrier signal, a telecommunications signal, a software distribution medium, and the like. It should be noted that content included in the computer-readable medium may be appropriately added or deleted based on requirements of legislation and patent practice in a jurisdiction. For example, in some jurisdictions, according to legislation and patent practice, the computer-readable medium includes neither an electrical carrier signal nor a telecommunications signal.

It should be noted that for ease of description, the foregoing method embodiments are described as a combination of a series of actions. However, a person skilled in the art should understand that this application is not limited to the described action order, because according to this application, some steps may be performed in another order or simultaneously. In addition, a person skilled in the art should also understand that the embodiments described in this specification are all preferred embodiments, and involved actions and modules are not necessarily mandatory to this application.

In the foregoing embodiments, descriptions of the embodiments have respective focuses. For a part that is not described in detail in an embodiment, refer to related descriptions in another embodiment.

The preferred embodiments of this application disclosed above are merely intended to help describe this application. In the optional embodiments, all details are not described in detail, and the present invention is not limited to the specific implementations. Obviously, many modifications and changes may be made based on the content of this application. These embodiments are selected and specifically described in this application to better explain the principle and the actual application of this application, so that a person skilled in the art can better understand and use this application. This application is only subjected to the claims and the scope and equivalents thereof.

What is claimed is:

1. A method of generating audio and video materials, comprising:
    receiving an audio and video material generation request for generating a target audio and video material corresponding to a phoneme sequence, wherein the audio and video material generation request comprises a character identifier representing a character in the target audio and video material;
    determining a target set based on the character identifier, wherein the target set comprises phoneme information and video segments corresponding to the phoneme information, wherein the phoneme information indicates timings of phonemes, and wherein the target set is among pre-created character sets corresponding to different characters;
    obtaining a phoneme information sequence from the target set based on the phoneme sequence;
    determining a video segment corresponding to each piece of phoneme information in the phoneme information sequence; and
    generating the target audio and video material corresponding to the phoneme sequence based at least in part on the video segment corresponding to each piece of phoneme information in the phoneme information sequence, wherein the generating the target audio and video material corresponding to the phoneme sequence comprises:
    capturing audio segments in an initial format from audio corresponding to the phoneme information sequence based on a preset capturing rule,
    splicing the audio segments into a target audio material based on a preset splicing rule,
    generating a target video material based on the video segment corresponding to each piece of phoneme information, and
    aligning the target audio material and the target video material to generate the target audio and video material.

2. The method according to claim 1, wherein before the determining a target set based on the character identifier, the method further comprises:
    determining a to-be-processed audio and video, and generating character phoneme information of a character in the to-be-processed audio and video;
    capturing video segments from the to-be-processed audio and video based on the character phoneme information; and
    creating a character set corresponding to the character based on the character phoneme information and the captured video segments.

3. The method according to claim 2, wherein the generating character phoneme information of a character in the to-be-processed audio and video further comprises:

determining a preset phoneme recognition rule;
recognizing an initial phoneme and a final phoneme of the character in audio in the to-be-processed audio and video based on the preset phoneme recognition rule to form a phoneme set; and
determining time interval information corresponding to each phoneme in the phoneme set in the audio; and
generating the character phoneme information based on the time interval information.

4. The method according to claim 1, wherein before the receiving an audio and video material generation request, the method further comprises:
obtaining target text; and
recognizing the target text and generating the phoneme sequence corresponding to the target text.

5. The method according to claim 4, wherein the recognizing the target text and generating the phoneme sequence of the target text further comprises:
splitting the target text to obtain a target word in the target text;
recognizing phonemes corresponding to each target word; and
generating the phoneme sequence corresponding to the target text based on the recognized phonemes.

6. The method according to claim 1, wherein after the generating the target audio and video material corresponding to the phoneme sequence, the method further comprises:
storing the target audio and video material, the phoneme sequence, and a corresponding relationship between them in an audio and video material library.

7. The method according to claim 6, wherein after the storing the target audio and video material, the phoneme sequence, and a corresponding relationship between them in an audio and video material library, the method further comprises:
receiving a video generation request for generating a video of a target character, wherein the request comprises a to-be-processed phoneme sequence;
obtaining a to-be-processed audio and video material from the audio and video material library based on the to-be-processed phoneme sequence; and
generating a target video based on the to-be-processed audio and video material.

8. The method according to claim 7, wherein the video generation request comprises video processing information; and wherein the generating a target video based on the to-be-processed audio and video material further comprises:
processing the to-be-processed audio and video material based on the video processing information to generate the target video.

9. The method according to claim 8, wherein the to-be-processed audio and video material comprises a default subtitle; and wherein the processing the to-be-processed audio and video material based on the video processing information to generate the target video further comprises:
determining a to-be-processed default subtitle in the to-be-processed audio and video material; and
adjusting the to-be-processed default subtitle based on the video processing information to generate the target video that comprises a target subtitle.

10. The method according to claim 1, wherein the aligning the target audio material and the target video material to generate the target audio and video material further comprises:
determining an audio duration corresponding to the target audio material and a video duration corresponding to the target video material; and
adjusting the audio duration and the video duration such that they are consistent with each other; and
generating the target audio and video material based on the adjusted target video material and the adjusted target audio material.

11. A system, comprising:
at least one processor; and
at least one memory communicatively coupled to the at least one processor and comprising computer-readable instructions that upon execution by the at least one processor cause the at least one processor to perform operations comprising:
receiving an audio and video material generation request for generating a target audio and video material corresponding to a phoneme sequence, wherein the audio and video material generation request comprises a character identifier representing a character in the target audio and video material;
determining a target set based on the character identifier, wherein the target set comprises phoneme information and video segments corresponding to the phoneme information, wherein the phoneme information indicates timings of phonemes, and wherein the target set is among pre-created character sets corresponding to different characters;
obtaining a phoneme information sequence from the target set based on the phoneme sequence;
determining a video segment corresponding to each piece of phoneme information in the phoneme information sequence; and
generating the target audio and video material corresponding to the phoneme sequence based at least in part on the video segment corresponding to each piece of phoneme information in the phoneme information sequence, wherein the generating the target audio and video material corresponding to the phoneme sequence comprises:
capturing audio segments in an initial format from audio corresponding to the phoneme information sequence based on a preset capturing rule,
splicing the audio segments into a target audio material based on a preset splicing rule,
generating a target video material based on the video segment corresponding to each piece of phoneme information, and
aligning the target audio material and the target video material to generate the target audio and video material.

12. The system according to claim 11, wherein before the determining a target set based on the character identifier, the operations further comprise:
determining a to-be-processed audio and video, and generating character phoneme information of a character in the to-be-processed audio and video;
capturing video segments from the to-be-processed audio and video based on the character phoneme information; and
creating a character set corresponding to the character based on the character phoneme information and the captured video segments.

13. The system according to claim 12, wherein the generating character phoneme information of a character in the to-be-processed audio and video further comprises:
determining a preset phoneme recognition rule;
recognizing an initial phoneme and a final phoneme of the character in audio in the to-be-processed audio and video based on the preset phoneme recognition rule to form a phoneme set; and determining time interval information corresponding to each phoneme in the phoneme set in the audio; and generating the character phoneme information based on the time interval information.

14. The system according to claim 11, wherein before the receiving an audio and video material generation request, the method further comprises:

obtaining target text; and recognizing the target text and generating the phoneme sequence corresponding to the target text.

15. The system according to claim 11, wherein after the generating the target audio and video material corresponding to the phoneme sequence, the method further comprises:

storing the target audio and video material, the phoneme sequence, and a corresponding relationship between them in an audio and video material library.

16. The system according to claim 15, wherein after the storing the target audio and video material, the phoneme sequence, and a corresponding relationship between them in an audio and video material library, the method further comprises:

receiving a video generation request for generating a video of a target character, wherein the request comprises a to-be-processed phoneme sequence, wherein the video generation request comprises video processing information;

obtaining a to-be-processed audio and video material from the audio and video material library based on the to-be-processed phoneme sequence; and generating the target video by processing the to-be-processed audio and video material based on the video processing information.

17. A non-transitory computer-readable storage medium, storing computer-readable instructions that upon execution by a computing device cause the computing device to implement operations comprising:

receiving an audio and video material generation request for generating a target audio and video material corresponding to a phoneme sequence, wherein the audio and video material generation request comprises a character identifier representing a character in the target audio and video material;

determining a target set based on the character identifier, wherein the target set comprises phoneme information and video segments corresponding to the phoneme information, wherein the phoneme information indicates timings of phonemes, and wherein the target set is among pre-created character sets corresponding to different characters;

obtaining a phoneme information sequence from the target set based on the phoneme sequence;

determining a video segment corresponding to each piece of phoneme information in the phoneme information sequence; and generating the target audio and video material corresponding to the phoneme sequence based at least in part on the video segment corresponding to each piece of phoneme information in the phoneme information sequence, wherein the generating the target audio and video material corresponding to the phoneme sequence comprises:

capturing audio segments in an initial format from audio corresponding to the phoneme information sequence based on a preset capturing rule, splicing the audio segments into a target audio material based on a preset splicing rule, generating a target video material based on the video segment corresponding to each piece of phoneme information, and aligning the target audio material and the target video material to generate the target audio and video material.

18. The non-transitory computer-readable storage medium according to claim 17, wherein before the determining a target set based on the character identifier, the operations comprise:

determining a to-be-processed audio and video, and generating character phoneme information of a character in the to-be-processed audio and video;

capturing video segments from the to-be-processed audio and video based on the character phoneme information; and creating a character set corresponding to the character based on the character phoneme information and the captured video segments.

19. The non-transitory computer-readable storage medium according to claim 17, wherein before the receiving an audio and video material generation request, the operations comprise:

obtaining target text; and recognizing the target text and generating the phoneme sequence corresponding to the target text.

20. The non-transitory computer-readable storage medium according to claim 17, wherein after the generating the target audio and video material corresponding to the phoneme sequence, the operations further comprise:

storing the target audio and video material, the phoneme sequence, and a corresponding relationship between them in an audio and video material library.

* * * * *